(12) United States Patent
Tanimura et al.

(10) Patent No.: US 7,219,893 B2
(45) Date of Patent: May 22, 2007

(54) GAMING MACHINE

(75) Inventors: Tatsuhiko Tanimura, Tokyo (JP); Hirofumi Sekiguchi, Tokyo (JP)

(73) Assignee: ARUZE Corporation, Tokyo (JP)

( * ) Notice: Subject to any disclaimer, the term of this patent is extended or adjusted under 35 U.S.C. 154(b) by 137 days.

(21) Appl. No.: 10/697,248

(22) Filed: Oct. 31, 2003

(65) Prior Publication Data

US 2004/0227286 A1 Nov. 18, 2004

(30) Foreign Application Priority Data

May 14, 2003 (JP) .............................. 2003-136632

(51) Int. Cl.
*A63B 71/00* (2006.01)
(52) U.S. Cl. .......................... 273/143; 463/13; 463/16; 463/20; 463/25; 463/30
(58) Field of Classification Search ................ 237/143; 463/16, 20, 30, 25, 13; 273/143
See application file for complete search history.

(56) References Cited

U.S. PATENT DOCUMENTS

| | | | | | |
|---|---|---|---|---|---|
| 2,058,738 | A | * | 10/1936 | St Laurent .................. | 327/602 |
| 3,574,993 | A | * | 4/1971 | Black .......................... | 368/67 |
| 4,167,307 | A | * | 9/1979 | Cirkler et al. ................ | 349/68 |
| 4,756,414 | A | * | 7/1988 | Mott .......................... | 206/720 |
| 4,838,661 | A | * | 6/1989 | McKee et al. ................ | 349/68 |
| 4,976,429 | A | * | 12/1990 | Nagel .......................... | 463/34 |
| 5,018,837 | A | * | 5/1991 | McKee et al. ................ | 349/63 |
| 5,139,340 | A | * | 8/1992 | Okumura ..................... | 349/99 |
| 5,143,433 | A | * | 9/1992 | Farrell .......................... | 362/29 |
| 5,339,179 | A | * | 8/1994 | Rudisill et al. ................ | 349/65 |
| 6,088,074 | A | * | 7/2000 | Suzuki .......................... | 349/62 |
| 6,181,301 | B1 | * | 1/2001 | Inoguchi et al. ................ | 345/5 |

(Continued)

FOREIGN PATENT DOCUMENTS

JP 2000-140202 5/2000

(Continued)

OTHER PUBLICATIONS

European Search Report Dated Aug. 12, 2004.

(Continued)

*Primary Examiner*—Eugene Kim
*Assistant Examiner*—Dolores R. Collins
(74) *Attorney, Agent, or Firm*—Rader, Fishman & Grauer PLLC

(57) ABSTRACT

A gaming machine includes a liquid crystal display having a liquid crystal panel and a light guiding plate placed at the rear of the liquid crystal panel and formed with a light deflection pattern for guiding light emitted from illumination means into the liquid crystal panel, and a variable display device placed at the rear of the liquid crystal display and having a plurality of reels provided in a row. Parts of the light guiding plate to which the reels are opposed are made light transmission areas. The light guiding plate is formed with a first light deflection pattern on the periphery of the light transmission areas and is formed with a second light deflection pattern in a portion more distant from the light transmission areas than the first light deflection pattern. The first light deflection pattern is denser than the second light deflection pattern.

6 Claims, 6 Drawing Sheets

U.S. PATENT DOCUMENTS

| | | |
|---|---|---|
| 6,456,344 B1 | 9/2002 | Nemoto et al. |
| 6,620,044 B1 * | 9/2003 | Okada ................. 463/20 |
| 6,659,867 B1 * | 12/2003 | Kodachi et al. ......... 463/20 |
| 6,699,122 B1 * | 3/2004 | Osawa ................. 463/20 |
| 6,799,860 B2 * | 10/2004 | Nakaoka et al. ......... 362/31 |
| 6,800,026 B2 * | 10/2004 | Cannon ................. 463/16 |
| 6,835,134 B2 * | 12/2004 | Poole et al. ........... 463/25 |
| 2001/0031658 A1 * | 10/2001 | Ozaki et al. ........... 463/16 |
| 2003/0007342 A1 * | 1/2003 | Suzuki et al. .......... 362/31 |
| 2003/0031453 A1 | 2/2003 | Tsubokura et al. |
| 2003/0063235 A1 * | 4/2003 | Nakaoka et al. ......... 349/65 |
| 2003/0087690 A1 * | 5/2003 | Loose et al. ........... 463/20 |
| 2003/0147233 A1 * | 8/2003 | Sugiura et al. ......... 362/31 |
| 2004/0152502 A1 * | 8/2004 | Okada ................. 463/16 |
| 2004/0171418 A1 * | 9/2004 | Okada ................. 463/20 |
| 2004/0207154 A1 * | 10/2004 | Okada ................. 273/138.1 |
| 2004/0209668 A1 * | 10/2004 | Okada ................. 463/20 |
| 2004/0209678 A1 * | 10/2004 | Okada ................. 463/30 |
| 2004/0214635 A1 * | 10/2004 | Okada ................. 463/30 |
| 2004/0214637 A1 * | 10/2004 | Nonaka ................. 463/31 |
| 2004/0224758 A1 * | 11/2004 | Okada et al. ........... 463/31 |
| 2004/0227866 A1 * | 11/2004 | Okada ................. 349/58 |
| 2004/0229686 A1 * | 11/2004 | Tanimura et al. ........ 463/30 |
| 2004/0246203 A1 * | 12/2004 | Nakaoka ............... 345/39 |

FOREIGN PATENT DOCUMENTS

| | | |
|---|---|---|
| JP | 2000-350805 | 12/2000 |
| JP | 2002-055675 | 2/2002 |
| JP | 2002143377 | 5/2002 |
| WO | WO 03/039699 A1 | 5/2003 |

OTHER PUBLICATIONS

Office Action Issued by the Japanese Patent Office mailed on Oct. 19, 2004.

* cited by examiner

FIG. 2

| | LEFT REEL | CENTER REEL | RIGHT REEL |
|---|---|---|---|
| 00 | 7 | 7 | 7 |
| 01 | cherry | bell(plain) | bell(winged) |
| 02 | 7(winged) | Replay | Replay |
| 03 | bell(winged) | bell(winged) | BAR |
| 04 | Replay | cherry | bell(plain) |
| 05 | 7 | Replay | bell(winged) |
| 06 | cherry | cherry | Replay |
| 07 | 7(winged) | bell(winged) | cherry |
| 08 | bell(winged) | BAR | 7(winged) |
| 09 | Replay | cherry | cherry |
| 10 | bell(plain) | Replay | bell(winged) |
| 11 | bell(winged) | bell(winged) | Replay |
| 12 | Replay | 7(winged) | cherry |
| 13 | BAR | Replay | bell(plain) |
| 14 | 7 | cherry | bell(winged) |
| 15 | bell(winged) | bell(winged) | Replay |
| 16 | bell(plain) | BAR | cherry |
| 17 | Replay | bell(plain) | 7(winged) |
| 18 | bell(plain) | Replay | bell(winged) |
| 19 | bell(winged) | bell(winged) | Replay |
| 20 | Replay | cherry | cherry |

Reference numerals: 91 (at 02 left), 92 (at 05 left), 97 (at 06 left), 93 (at 13 left), 94 (at 15 left), 95 (at 16 left), 96 (at 17 left).

GAMING MACHINE

BACKGROUND OF THE INVENTION

1. Field of the Invention

The present invention relates to a gaming machine such as a pinball slot machine (a so-called "Pachi-Slot machine" in Japan) or a pinball machine (a so-called "Pachinko machine" in Japan) including a liquid crystal display aside from a variable display device provided with a plurality of reels.

2. Description of the Related Art

For example, a pinball slot machine (a so-called "Pachi-Slot machine" in Japan) has a mechanical variable display device provided with a plurality of reels for variably displaying symbols in a front display window or an electrical variable display device for displaying symbols on reels on a screen. As the player performs start operation, control means controls the variable display device for rotating the reels, thereby producing variable display of symbols. Then, the rotating reels are stopped in order automatically in a given time or as the player performs stop operation. At this time, if the symbols on the reels appearing in the display window become a specific combination (winning symbol combination), game play media such as medals or coins are paid out to the player as the prize of the win.

In the current mainstream model, to complete a winning game for paying out medals and coins to the player as a specific symbol combination is arranged along the pay line made activated, which will be hereinafter referred to as activated line, it is required that a prize be won according to internal lottery processing (simply, internal lottery), which will be hereinafter referred to as internal winning, and that the player perform stop operation at the timing at which the symbol combination indicating completion of the winging game of the prize gaining the internal winning, which will be hereinafter referred to as internal winning combination, can be stopped on the activated line. That is, even if the internal winning is accepted, if the player cannot perform the stop operation at the good timing, the player cannot complete the winning game of the internal winning combination. That is, the gaming machines requiring that the player have a technique for performing the stop operation at the good timing (the relative importance of intervention of the technique called "observation push" is high) are mainstream at present.

A gaming machine is provided for displaying on a liquid crystal display provided aside from the mechanical variable display device, a symbol or a message required for arranging a specific symbol combination along the activated line when the variable display device stops based on the skill of the player concerning the press push so that even the player having a low skill of game play operation can play a game taking an interest in the game play.

The gaming machine in the related art includes the liquid crystal display being disposed in front of reels viewed from the front for displaying an image from the outside of the area of a reel display window to the inside of the area and superposing the image on the reel symbols for display to enhance the effect of the game aside from the mechanical variable display device for stopping and displaying symbols on reels with respect to a symbol combination responsive to the winning state of game play.

In the liquid crystal display used at the time, the reel-opposed part of a light guiding plate with a light deflection pattern on the back to guide light into a liquid crystal panel, which will be hereinafter referred to as reel window, is cut out, and the player visually recognizes the symbols on each reel through the reel window. A fluorescent lamp for applying light to the light guiding plate is placed above and below the light guiding plate.

The above configuration is disclosed in JP-A-2002-143377 (see paragraph [0053]; and FIG. 4).

SUMMARY OF THE INVENTION

In the gaming machine in the related art as described above, if the liquid crystal display is upsized, for example, from 15 inches to 20 inches, each fluorescent lamp for illumination is also upsized to increase the light application amount and the thickness of the light guiding plate also increases. As the thickness of the light guiding plate thus increases, the player visually recognizes the light deflection pattern formed on the back of the light guiding plate through the reel window. That is, the area with no light deflection (scatter) pattern of the light guiding plate (for example, window) and the cutout portion of a diffusion sheet (for example, window) are the same shape. Thus, if the player sees the liquid crystal panel from the slanting direction, the player can visually observe directly the back of the light guiding plate not via the diffusion sheet; the appearance of the machine is impaired.

It is therefore an object of the invention to provide a gaming machine whose appearance is not impaired if the player sees a liquid crystal panel from a slanting direction.

According to the invention as claimed in claim 1, there is provided a gaming machine including: a liquid crystal display device 27 including a liquid crystal panel 173, and a light guiding plate 174 disposed at a rear of the liquid crystal panel 173 and formed with a light deflection pattern configured to guide light emitted from an illumination means 176a, 176b for the liquid crystal panel 173 to the liquid crystal panel 173; and a variable display device disposed at a rear of the liquid crystal display device 27 and including a plurality of reels 3L, 3C, and 3R provided in a row each on which a plurality of symbols are arranged, wherein a part 40L, 40C, 40R of the light guiding plate 174 to which each of the reels 3L, 3C, 3R is opposed is configured as a light transmission area for transmitting light from the reel 3L, 3C, 3R, wherein the light guiding plate 174 is formed with a first light deflection pattern 174e on a periphery of the light transmission area and is formed with a second light deflection pattern 174d in a portion more distant from the light transmission area than the first light deflection pattern 174e, and wherein the first light deflection pattern 174e is formed with a pattern denser than a pattern of the second light deflection pattern 174d, for example, as shown in FIGS. 3 and 4.

In the configuration, the part of the light guiding plate to which the reel is opposed is configured as a light transmission area for allowing light from the reel to pass through and the light guiding plate is formed with the first light deflection pattern on the periphery of the light transmission area and is formed with the second light deflection pattern in a portion more distant from the light transmission area than the first light deflection pattern and moreover the first light deflection pattern is denser than the second light deflection pattern. Thus, if the player sees the reel from the slanting direction, the player first visually recognizes in the surroundings of the reel, the first light deflection pattern denser than the second light deflection pattern, so that the appearance of the gaming machine is not impaired.

In the gaming machine of the invention, the liquid crystal display 27 may have light diffusion means 178 with a part to which each of the reels 3L, 3C, 3R is opposed as a light transmission area, between the liquid crystal panel 173 and the light guiding plate 174, and the first light deflection pattern 174e may be formed in the portion of the light guiding plate 174 that can be visually recognized through the light transmission area of the light diffusion means 178.

In the gaming machine of the invention, the illumination means 176a, 176b may be a plurality of cold-cathode tubes arranged in the depth direction of the light guiding plate 174.

In the configuration, the illumination means is a plurality of cold-cathode tubes arranged in the depth direction of the light guiding plate. Thus, if the liquid crystal panel is upsized, it can be illuminated at sufficient brightness.

BRIEF DESCRIPTION OF THE DRAWINGS

In the accompanying drawings:

FIG. 2 is a drawing to show examples of symbols arranged on reels;

DETAILED DESCRIPTION OF THE PREFERRED EMBODIMENTS

Figure 1:
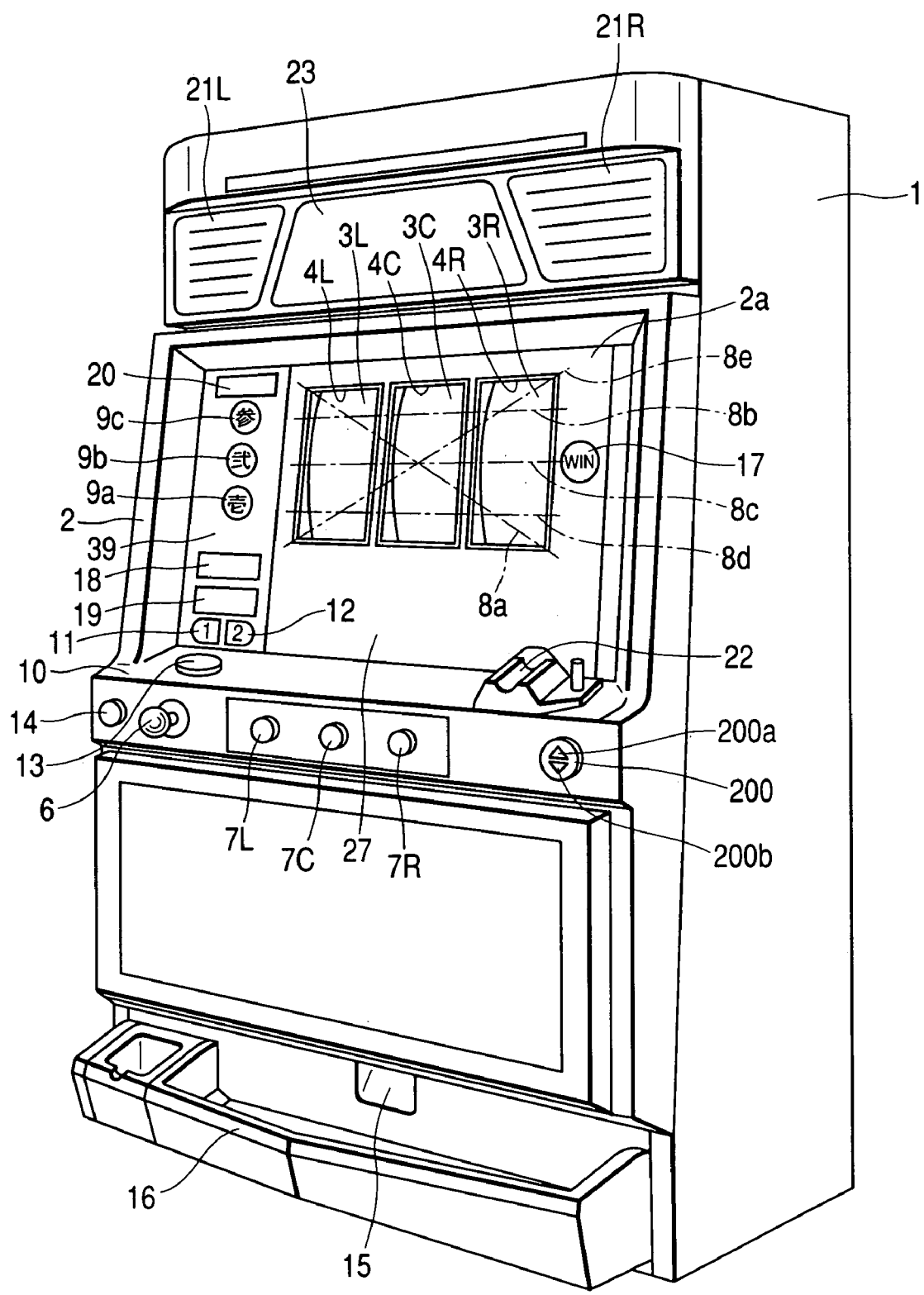
FIG. 1 is a perspective front view of a slot machine of an embodiment of the invention.

Referring now to the accompanying drawings, there is shown a preferred embodiment of the invention. FIGS. 1 through 6 show one embodiment of the invention. In the figures, members denoted by the same reference numerals represent the same or corresponding members, and a detailed description of the same parts will be omitted.

FIG. 1 is a perspective front view to show the appearance of a gaming machine 1 of an embodiment of the invention. The gaming machine 1 is a pinball slot machine (a so-called "Pachi-Slot machine" in Japan). The gaming machine 1 is provided for the player to play a game using game play media such as a card storing information of the game play value given to the player as well as coins, medals, game play balls and tokens. In the description that follows, it is assumed that the player uses medals.

A panel display unit 2a roughly as a vertical plane is formed at the front of a cabinet 2 forming the whole of the gaming machine 1, and vertically oriented rectangular reel display windows 4L, 4C, and 4R are provided at the center of the panel display unit 2a. The reel display windows 4L, 4C, and 4R are formed with a top line 8b, a center line 8c, and a bottom line 8d in the horizontal direction and a cross down line 8a and cross up line 8e in the slanting directions as pay lines. As the pay lines, one, three, or five lines are made activated as the player operates a 1-BET switch 11, a 2-BET switch 12, or a MAX-BET switch 13 (described later) or inserts medals into a medal insertion slot 22. Which pay lines are made activated is indicated as a BET lamp 9a, 9b, or 9c (described below) is lighted. The pay lines 8a to 8e are involved in whether or not a winning combination is won.

That is, if one symbol (for example, "cherry symbol 97" (described later)) corresponding to a predetermined prize (for example, small prize of cherry (described later)) is stopped and displayed at a predetermined position (for example, a position in the left display window 4L if the BET count (described later) is "3") corresponding to any pay line made activated or if the symbols making up the symbol combination corresponding to a predetermined prize are stopped and displayed in a row at a predetermined position corresponding to any pay line made activated, the winning game of the predetermined prize is complete.

In the cabinet 2b, three reels 3L, 3C, and 3R each with a symbol row including different types of symbols placed on the outer peripheral surface are provided in a row for rotation, making up variable display device. The player can observe the symbols on the reels through the reel display windows 4L, 4C, and 4R. Each reel rotates at a constant rotation speed, for example, 80 revolutions per minute.

The 1-BET lamp 9a, the 2-BET lamp 9b, the MAX-BET lamp 9c, and a credit display unit 19 are provided on the left of the reel display windows 4L, 4C, and 4R. The 1-BET lamp 9a, the 2-BET lamp 9b, or the MAX-BET lamp 9c is lighted in response to the number of medals bet to play one game, which will be hereinafter referred to as the BET count. In the embodiment, one game is over when all reels stop. When the BET count is "1" and one pay line is made activated, the 1-BET lamp 9a is lighted; when the BET count is "2" and three pay lines are made activated, the 2-BET lamp 9b is lighted; and when the BET count is "3" and all the five pay lines are made activated, the MAX-BET lamp 9c is lighted. The credit display unit 19 includes seven-segment LEDs for displaying the deposited number of medals.

A notification lamp (WIN lamp 17) and a payout display unit 18 are provided on the right of the reel display windows 4L, 4C, and 4R. The notification lamp 17 basically is lighted until a winning game of BB or RB is complete after it is made possible to realize completion of the win of BB or RB. The BB and RB will be hereinafter collectively called "bonus." The payout display unit 18 includes seven-segment LEDs for displaying the number of medals paid out when a winning game is complete.

The BB and RB are as follows: The current mainstream model has different winning states. Particularly, when the winning game of a prize is complete, the player is placed in a gaming state in which the player is given a better condition than the usual state for a predetermined time period in addition to paying out a predetermined number of medals. Such prizes include a prize for allowing the player to play a predetermined number of games giving a relatively large prize to the player, and a prize for allowing the player to play a predetermined number of games giving a relatively small prize to the player. The former is referred to as big bonus (BB), and the latter is referred to as regular bonus (RB).

A bonus game information display unit 20 is provided in the upper right corner of the panel display unit 2a. The bonus game information display unit 20 includes seven-segment LEDs for displaying the number of games in BB ordinary gaming state (described later). A frontward projection portion 10 of a horizontal plane is formed below the reel display windows 4L, 4C, and 4R. A liquid crystal display 27 is placed between the frontward projection portion 10 and the reel display windows 4L, 4C, and 4R for displaying information concerning game play on the roughly full face of the liquid crystal display 27.

The medal insertion slot 22 is provided on the left of the liquid crystal display 27, and the 1-BET switch 11, the 2-BET switch 12, and the MAX-BET switch 13 are provided on the left of the liquid crystal display 27. The 1-BET switch 11 enables the player to bet one of the credited medals by one push operation on a game. The 2-BET switch 12 enables the player to bet two of the credited medals by one push operation on a game. The MAX-BET switch 13 enables the player to bet as many medals as the maximum number of medals that can be bet on a game by one push operation. As the player operates any of the BET switches, the corresponding pay lines are made activated as described above.

A C/P switch 14 for the player to switch between credit and payout of the medals obtained by playing games by pushbutton operation is provided on the left of the front of the frontward projection portion 10. As the C/P switch 14 is switched, medals are paid out from a medal payout opening 15 in a lower part of the front and are stored in a medal reception tray 16. On the right of the C/P switch 14, a start lever 6 for rotating the reels for starting variable display of symbols in the reel display windows 4L, 4C, and 4R as the player operates the start lever 6 is attached so that it can be turned in a predetermined angle range.

Speakers 21L and 21R are provided on the upper left and right of the cabinet 2, and a payout table panel 23 for displaying winning symbol combination, the number of payout medals, and the like is provided between the two speakers 21L and 21R. Three reel stop buttons (stop operation means) 7L, 7C, and 7R for stopping rotation of the three reels 3L, 3C, and 3R are provided at the center of the front of the frontward projection portion 10 and below the liquid crystal display 27.

A scroll switch 200 as switching means of a menu screen displayed on the liquid crystal display 27 is provided on the right of the reel stop button 7R; the player can switch a menu by operating an upper scroll switch 200a and a lower scroll switch 200b.

FIG. 2 shows symbol rows each made up of 21 symbols represented on each reel 3L, 3C, 3R used in the embodiment. The symbols are given code numbers 00 to 20 and are stored in ROM 32 (see FIG. 3) described later as a data table. The symbol rows each made up of symbols of "red 7 symbol 91," "blue 7 symbol 92," "BAR symbol 93," "bell symbol 94," "plum symbol 95," "Replay symbol 96," and "cherry symbol 97" are represented on the reels 3L, 3C, and 3R. The reels 3L, 3C, and 3R are rotated so that the symbol rows move in the lower arrow direction shown on the left in the figure.

Figure 3:
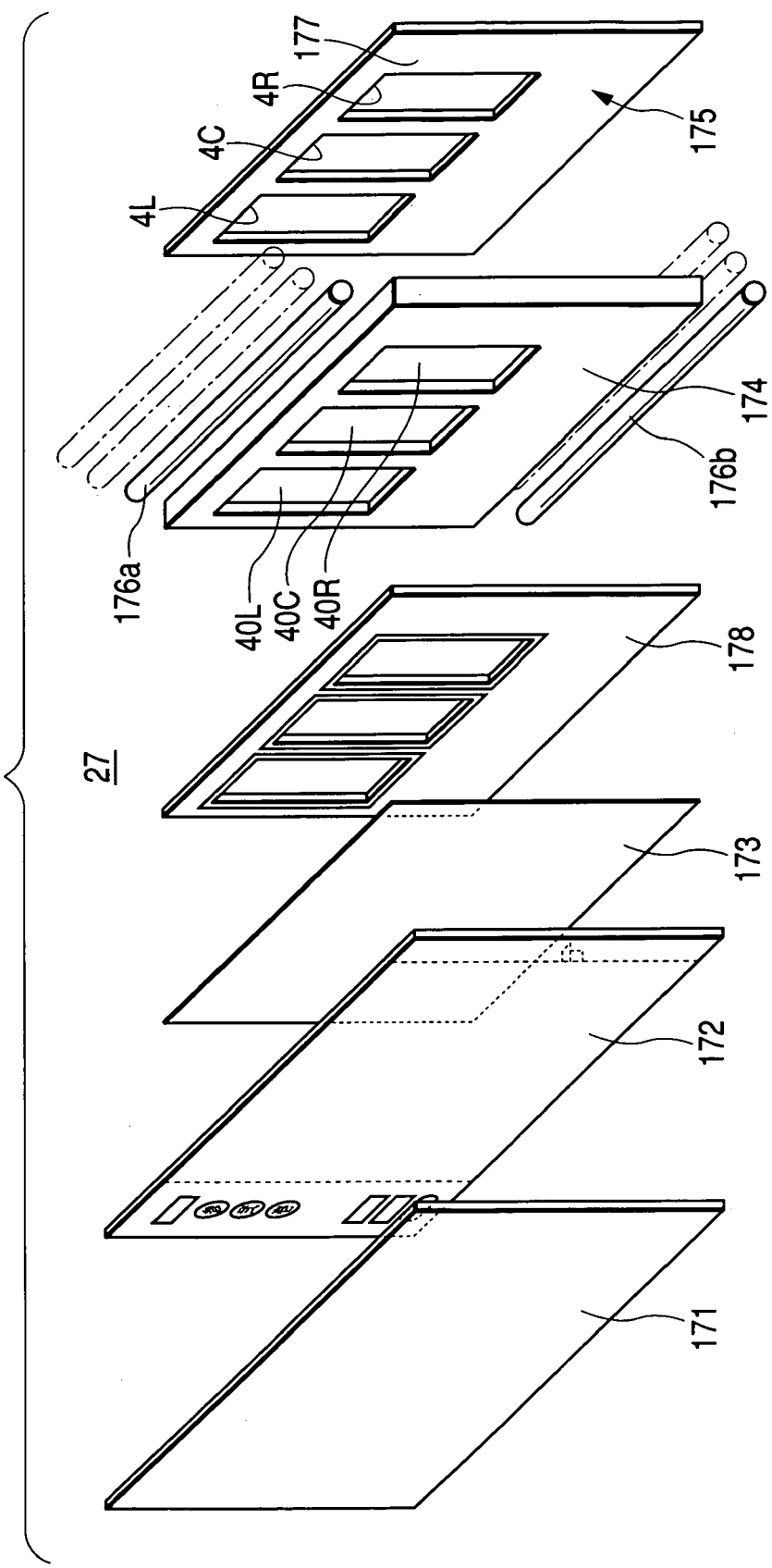
FIG. 3 is an exploded perspective view of a liquid crystal display.

FIG. 3 is an exploded perspective view to show a schematic configuration of the liquid crystal display 27. The liquid crystal display 27 includes protective glass 171 of the first layer provided on the front of the liquid crystal display 27, a display plate 172 of the second layer placed on the back of the protective glass 171, a liquid crystal panel 173 of the third layer placed on the back of the display plate 172, a light guiding plate 174 of the fourth layer placed on the back of the liquid crystal panel 173, and a reflection film 175 of the fifth layer placed on the back of the light guiding plate 174 as a five-layer panel structure. The liquid crystal display 27 further includes a flexible board (not shown) implemented as a table carrier package (TCP) on which a liquid crystal panel drive IC is mounted, connected to a terminal section of the liquid crystal panel 173, and the like. The liquid crystal display 27 is disposed on the front of the reels 3L, 3C, and 3R with a predetermined spacing from the reels 3L, 3C, and 3R as a separate body from the reels 3L, 3C, and 3R.

The protective glass 171 and the display plate 172 are formed each of a translucent member. The protective glass 171 is provided for the purpose of protecting the liquid crystal panel 173, etc., and an image is drawn in the area of the display plate 172 corresponding to the panel display unit 2a (see FIG. 1). FIG. 3 does not show various display units placed at the rear in the area of the display plate 172 corresponding to the panel display unit 2a or an electric circuit for operating the 1-BET lamp 9a, the 2-BET lamp 9b, and the MAX-BET lamp 9c.

The liquid crystal panel 173 is formed by sealing liquid crystal into the gap between a transparent substrate such as a glass plate formed with a thin-film transistor layer and a transparent substrate opposed to that substrate. The display mode of the liquid crystal panel 173 is set to normally white. The normally white is a mode in which white display is produced with the liquid crystal not driven, namely, light passes through to the display face side and is visually recognized from the outside. As the liquid crystal panel 173 set to normally white is adopted, if a situation in which the liquid crystal cannot be driven occurs, the player can visually recognize the symbols placed on the reels 3L, 3C, and 3R varying or stopped on the display through the reel display windows 4L, 4C, and 4R and can continue to play a game.

Further, a diffusion sheet 178 is placed between the liquid crystal panel 173 and the light guiding plate 174. The diffusion sheet 178 has the portions corresponding to windows 40L, 40C, and 40R cut out or is formed of a transparent member so as not to degrade the transparency of the windows 40L, 40C, and 40R, namely, so as to enhance the viewability of the reels 3L, 3C, and 3R positioned behind the liquid crystal display 27. The diffusion sheet 178 is used only for the part corresponding to the part of a light deflection pattern so that the player does not visually recognize the mesh state to make the player observe as if the light guiding plate 174 emitted light from the full face although the light deflection pattern on the back of the light guiding plate (described later) is a mesh state (or satin pattern); the diffusion sheet 178 differs from the liquid crystal panel 173 which is formed as full face.

The windows of the diffusion sheet 178 corresponding to the windows 40L, 40C, and 40R of the light guiding plate 174 are of the same shape as the windows 40L, 40C, and 40R of the light guiding plate 174, and the diffusion sheet 178 and the light deflection pattern on the back of the light guiding plate 174 are spaced from each other as much as the thickness of the light guiding plate 174. Therefore, if the player views the liquid crystal panel 173 from a slanting direction, a visual point occurs where the player can recognize the light deflection pattern of the light guiding plate 174 not via the diffusion sheet 178 from the window as the transmission area where the diffusion sheet 178 is not placed. In the embodiment, however, occurrence of the visual point can be eliminated.

The light guiding plate 174 is disposed on the back of the liquid crystal panel 173 for guiding light applied from cold-cathode tubes 176a and 176b placed on end faces into the liquid crystal panel 173 to illuminate the liquid crystal panel 173; the light guiding plate 174 is implemented as a translucent member having a light guide function, such as an acrylic-based resin, having a thickness of about 2 cm, for example. Fluorescent lamps can also be used in place of the cold-cathode tubes.

Figure 4:
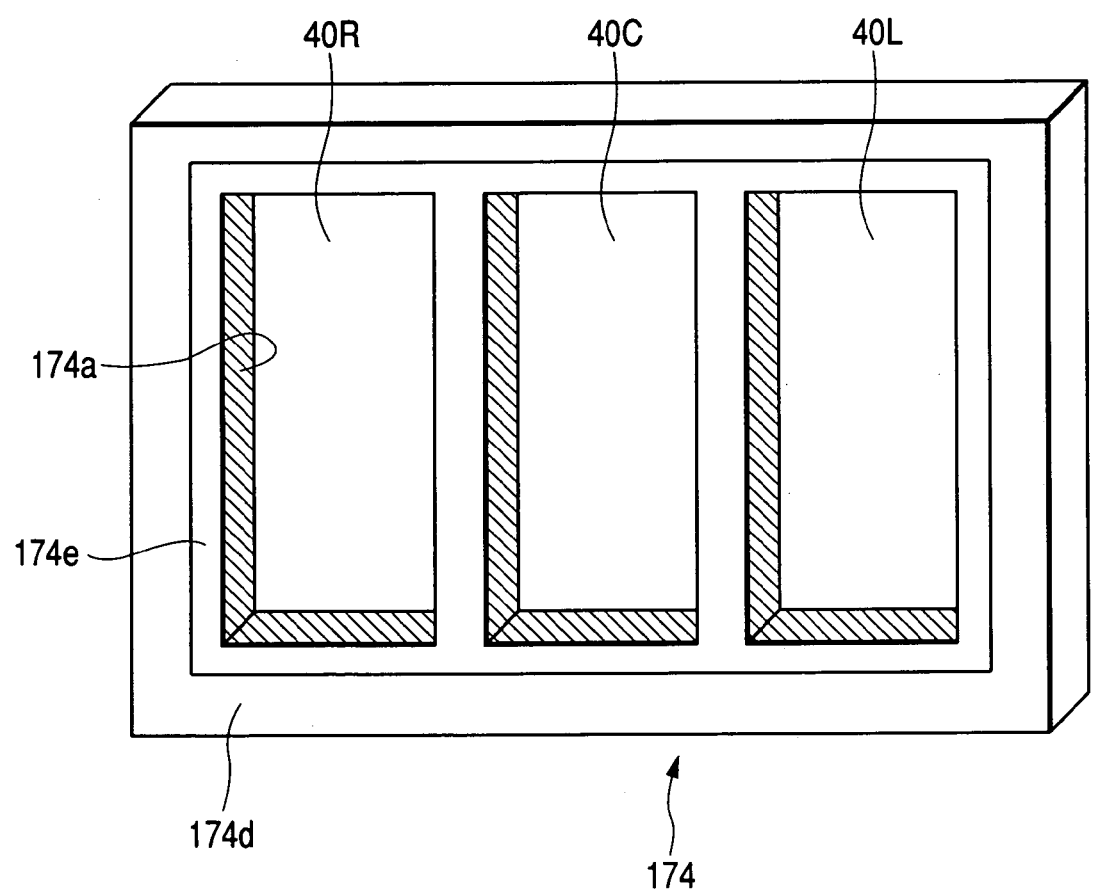
FIG. 4 is a perspective back view of a light guiding plate viewed from the reel side.

FIG. 4 is a perspective back view of the light guiding plate 174 observed from the reel side. As shown in the figure, in the light guiding plate 174, the parts 40R, 40C, and 40L positioned opposed to the reels 3L, 3C, and 3R are cut out, and the light deflection pattern for guiding the light from the cold-cathode tubes 176a and 176b into the liquid crystal panel 173 is formed on the face of the light guiding plate 174 on the reel side. The light deflection pattern includes a work face 174e as a first light deflection pattern formed so as to surround the cutout parts (reel windows 40R, 40C, and 40L)

and a work face 174*d* as a second light deflection pattern formed on the outside of the work face 174*e*. The work faces 174*e* and 174*d* are formed on the face of the light guiding plate 174 on the reel side. That is, the same plane is divided into two areas in which the work faces 174*e* and 174*d* are formed. The work face 174*d* is formed of a grid pattern at pitches of about 2 mm, for example, as a light guide pattern for causing the light guiding plate to uniformly emit light from the full face. On the other hand, the work face 174*e* is formed of a light deflection pattern finer than the work face 174*d*, for example, a grid pattern at pitches of about 0.5 mm. As the light guide pattern of the work face 174*d*, the roughness of the light deflection pattern may be varied from one part to another in such a manner that the light deflection pattern is made rough in a part near to the cold-cathode tube 176*a*, 176*b* and is made finer in a part (area) distant from the cold-cathode tube 176*a*, 176*b*, namely, as approaching the vicinity of the center of the light guiding plate 174, for example, to make more uniform light emission of the light guiding plate. In the embodiment, the structure wherein the parts corresponding to the windows are cut out is adopted, but the invention is not limited to it. A recess can also be formed without cutting out the transmission area or no light deflection pattern can also be formed for forming transmission area, enabling the player to easily see the reels 3L, 3C, and 3R.

As described above, the fine light deflection pattern is a high-density light deflection pattern. Thus, if the player visually observes the liquid crystal panel 173 from the slanting direction and can visually observe the light deflection pattern of the light guiding plate 174 not via the diffusion sheet 178 from the window as the transmission area where the diffusion sheet 178 is not placed, a visual point where the player can recognize the light deflection pattern as the light deflection pattern does not exist, and the appearance of the gaming machine is not impaired. Working for diffusing light is conducted on an end face 174*a*, 174*b*, 174*c* of the window according to a technique of blasting as a typical example, whereby the work face can also be provided with the diffusion effect like that of a diffusion sheet.

Due to the above configuration, the fine work face 174*e* and the fine blasted work face of the end face produce a synergistic effect, making it possible to still more prevent the player from recognizing the light deflection pattern on the back of the light guiding plate 174.

The purpose of making dense the light deflection pattern in the surroundings of the reel window 40L, 40C, 40R (fine work face) is to make the player hard to visually recognize the light deflection pattern; the player can concentrate on playing a game without being conscious of the presence of the light deflection pattern as compared with the case where the light deflection pattern is made rough.

The fine work faces 174*d* and 174*e* are subjected to high-productivity print. The material corresponding to ink may be transparent powder of the same as or similar to the material of the light guiding plate, for example. However, the invention is not limited to it; the light guiding plate may be formed with grid grooves by machining. For example, injection molding may be conducted for the light guiding plate. In this case, a pattern of grooves arranged like grids is formed on a mold or fine working of cone cut is conducted and a light deflection pattern is transferred to the surface of the light guiding plate 174 by injection molding. Blasting may be conducted.

In the description herein, the blasting refers to treatment of causing particles of an abrasive to collide with an end face at high speed for performing asperity treatment or fin removal.

In a case where a light deflection pattern like blasting is transferred to the end face 174*a*, 174*b*, 174*c* (see FIG. 5), the light deflection pattern functions as a backlight of the window 40L, 40C, 40R, improving color development of the liquid crystal panel 173 and making it possible to eliminate light emission unevenness of RGB-LED of reel backlight. Further, it also illuminates each reel 3L, 3C, 3R tending to become dark, and the color of each reel 3L, 3C, 3R is represented brightly. The number of steps can be reduced because pattern formation can be accomplished at a time together with the light deflection pattern formed on the work faces 174*d* and 174*e*.

It is hard to conduct print or molding on the end face 174*a*, 174*b*, 174*c* of the window of the light guiding plate 174, but blasting is easily conducted. Since auxiliary light for reel illumination is not required, the manufacturing cost of the gaming machine can be reduced accordingly, and production of noise by a drive circuit of auxiliary light is eliminated.

Figure 5:
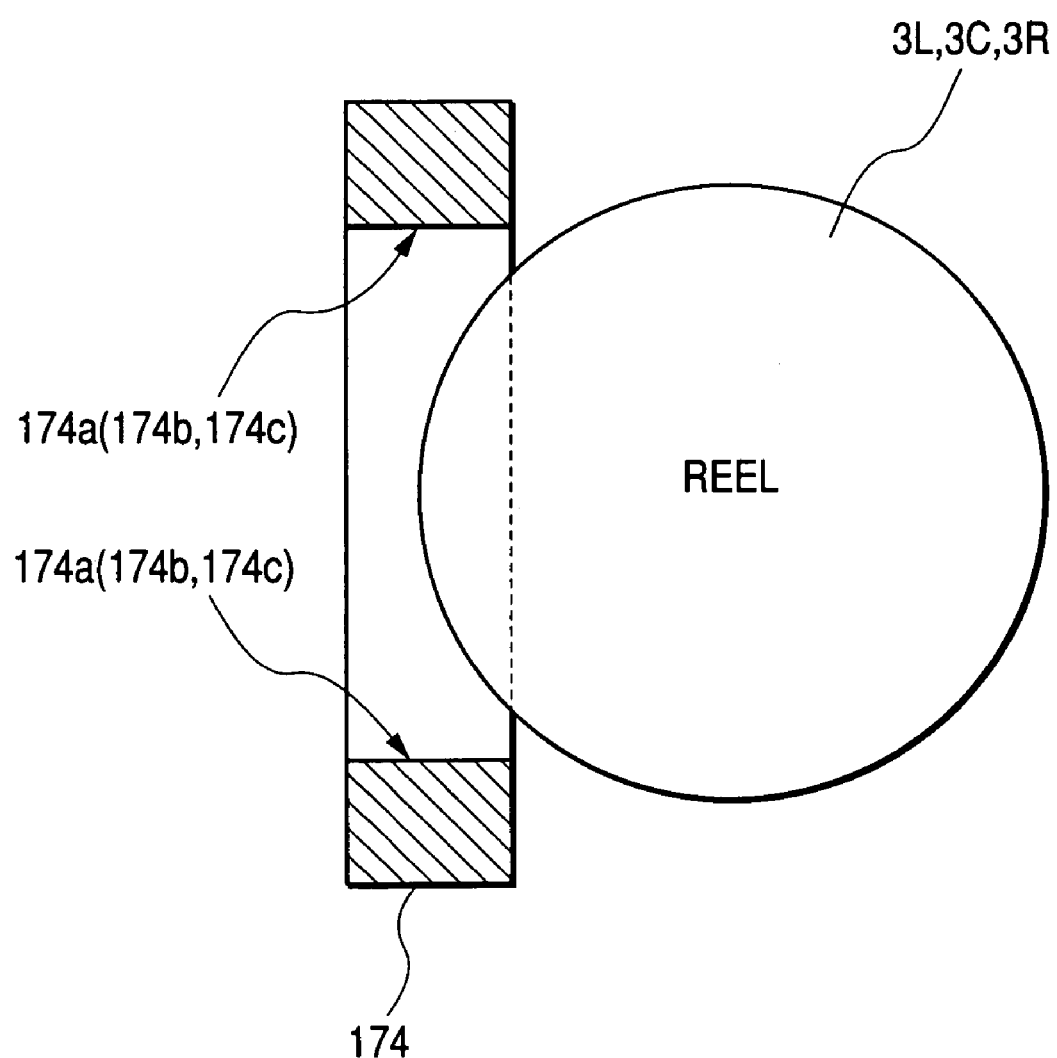
FIG. 5 is a sectional view to show placement of the light guiding plate and a reel.

FIG. 5 is a sectional view to describe the positional relationship to place each reel 3L, 3C, 3R and the light guiding plate 174. If the liquid crystal screen is upsized, for example, if the screen size is increased from 15 inches to 20 inches, it is advisable to provide a plurality of cold-cathode tubes 176*a* and 176*b* of light emission means in the depth direction to maintain the light amount. For example, the number of the cold-cathode tubes is increased from one to three. The light guiding plate 174 is also thickened as the number of the cold-cathode tubes is increased. If the light guiding plate 174 is thickened, the player is given the impression that the reels 3L, 3C, and 3R are at depth relative to the liquid crystal screen. However, if the front of each reel 3L, 3C, 3R is inserted into the cutout and each reel 3L, 3C, 3R is placed approaching the end face (in FIG. 4, the blasted face 174*a*, 174*b*, 174*c*), the liquid crystal screen and the reels 3L, 3C, and 3R are brought close to each other, so that the thickness of the light guiding plate 174 becomes unobtrusive.

In the embodiment, specific portions of the light guiding plate 174 are cut out by way of example. However, the light guiding plate 174 may be formed with recesses cut or formed from the side of the reel 3L, 3C, 3R into which a part of the reel 3L, 3C, 3R is inserted.

Referring again to FIG. 3, the cold-cathode tube 176*a*, 176*b* (if the screen size is large, a plurality of cold-cathode tubes are provided in the depth direction) is implemented as a white light source containing light of all wavelengths in a percentage in which a specific color is not conspicuous for eyes of a human being. The cold-cathode tube 176*a* is disposed along the upper end portion of the light guiding plate 174 (placed upright in the vertical direction) in the figure; the cold-cathode tube 176*b* is disposed along the lower end portion of the light guiding plate 174 in the figure. The cold-cathode tube 176*a*, 176*b* is supported at both ends by a lamp holder (not shown). The cold-cathode tube 176*a*, 176*b* functions as illumination means for the area corresponding to the effect display area mainly in the area of the liquid crystal panel 173. That is, the cold-cathode tube 176*a*, 176*b* generates light to be introduced into the light guiding plate 174.

The reflection film 175 is provided by executing sputter deposition of a silver evaporated film on a white polyester film or aluminum thin film, for example, and is used to reflect the light introduced into the light guiding plate 174 toward the front of the light guiding plate 174, namely, in the direction of the liquid crystal panel 173. The reflection film 175 includes a reflection area 177 and the reel display windows 4L, 4C, and 4R as non-reflection areas.

The left, center, and right reel display windows 4L, 4C, and 4R correspond to the left, center, and right reels 3L, 3C, and 3R respectively, and are formed as cutouts or formed of transparent material as light transmission display parts for allowing incident light to pass through. The reel display window 4L, 4C, 4R is positioned in front of the symbols displayed when rotation of the reel 3L, 3C, 3R stops, and has a size capable of displaying a total of three symbols at upper, center, and lower stages at the stop display time. The reflection area 177 of the reflection film 175 reflects incident light and functions as one of the illumination means for the area corresponding to the effect display area mainly in the area of the liquid crystal panel 173. The configuration enables the player to visually recognize variable display device and stop display of the reels 3L, 3C, and 3R through the light transmission display parts of the reflection means and thus makes it possible for the player to enjoy playing a game according to the display mode of the reels 3L, 3C, and 3R and the liquid crystal display 27.

Figure 6:
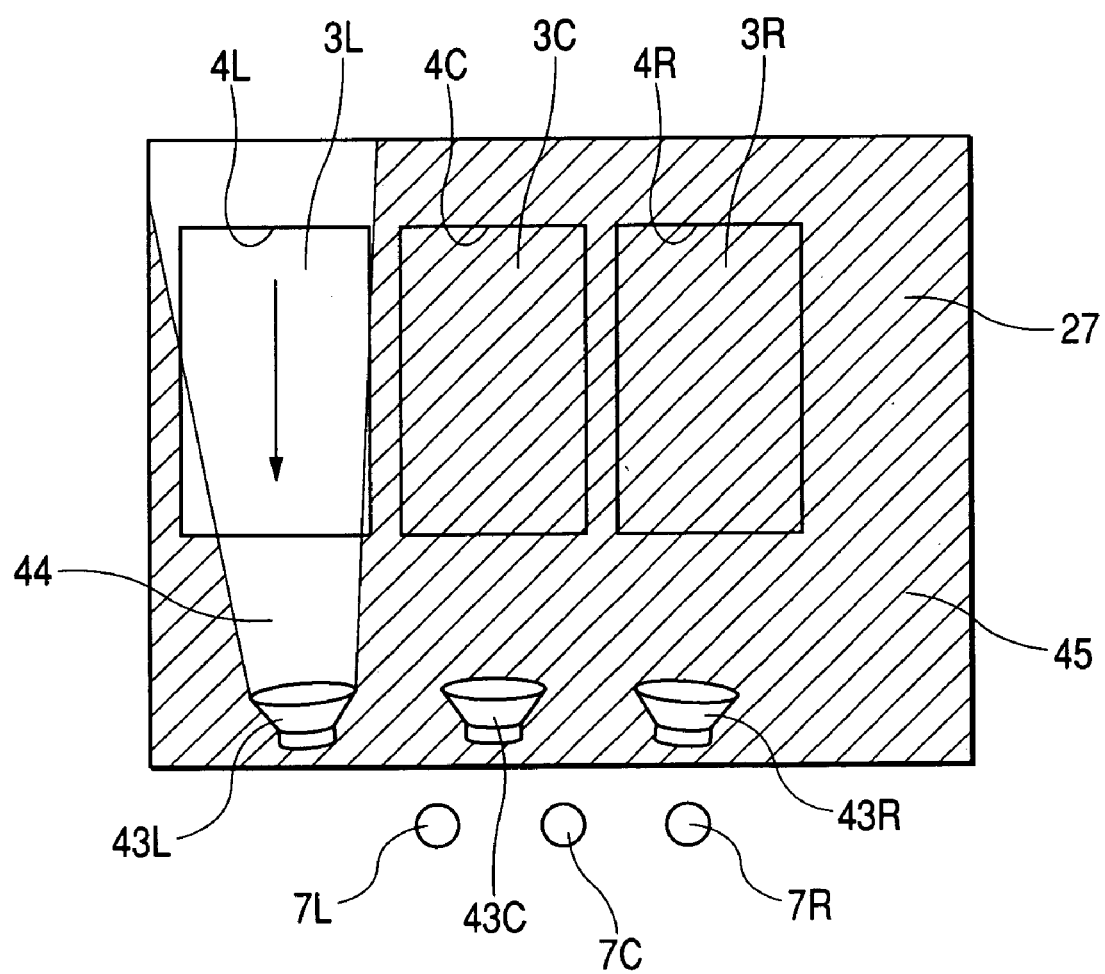
FIG. 6 is a schematic drawing to show the effect of the slot machine of the embodiment of the invention.

FIG. 6 is a schematic drawing to show an example of the effect mode of the gaming machine of the embodiment of the invention. It shows the display mode of stop notification for notifying the player of the stop order of the reels. The liquid crystal display 27 of the gaming machine can be made up of the protective glass, the display plate, the liquid crystal panel, the light diffusion film, the light guiding plate, and the reflection film in order from the front to the back as the panel structure as described above.

As shown in FIG. 6, virtual light sources 43L, 43C, and 43R are placed in order from left to right in the figure at the bottom of the liquid crystal display 27. The virtual light sources 43L, 43C, and 43R are formed as images on the liquid crystal panel 173 (see FIG. 3). From the virtual light source 43L, a searchlight image 44 as a light transmission display part is disposed as an image for illuminating the left reel 3L disposed above the virtual light source 43L. The searchlight image 44 is an image from the outside of the area of the reel display window 4L of the left reel 3L to the inside of the area and is superposed on the reel symbols through the display of the portion in the display area, whereby the symbols on the left reel 3L are displayed through the searchlight image 44. Accordingly, the player is notified of the reel stop order and is prompted to operate the button.

A non-transmission display area 45 of image area of the liquid crystal display 27 except for the searchlight image 44 and the display areas of the reel display windows of the center reel 3C and the right reel 3R are superposed on each other, whereby the player can be prevented from visually recognizing the center reel 3C and the right reel 3R which are producing variable display device.

According to the above configuration, the player can see the left reel 3L through the superposition of the searchlight image 44 and the display window 4L. According to the configuration of the embodiment, if the player sees the left reel 3L from the slanting lateral direction, the dense light deflection pattern 174e is formed on the face of the light guiding plate 174 on the reel side and therefore the player can see the dense light deflection pattern 174e on the periphery of the reel from the end of the window, introducing no problem from the viewpoint of the appearance of the gaming machine. Likewise, when the dense light deflection pattern 174e is formed on the end face of the window of the light guiding plate 174, the player can see the dense light deflection pattern 174e on the periphery of the reel, introducing no problem from the viewpoint of the appearance of the gaming machine.

In the embodiment, the superposition of the searchlight image 44 and each display window 4L, 4C, 4R shifts to the left, the right, the center, for example. Usually, the player is at the center of the gaming machine and operates the gaming machine; at this time, the player sees the reel 3L, 3R a little from the slanting lateral direction when the superposition shifts to the left or the right. Even in such a case, the dense light deflection pattern 174e is formed on the face of the light guiding plate 174 on the reel side and therefore the player can see the dense light deflection pattern 174e on the periphery of the reel; the appearance of the gaming machine is not impaired.

Further, the invention can be applied not only to the pinball slot machine as in the embodiment, but also to any other gaming machine such as a pinball machine (a so-called "Pachinko machine" in Japan).

The gaming machine of the embodiment includes the mechanical variable display device for stopping and displaying symbols on reels with respect to a symbol combination responsive to the winning state of game play and the liquid crystal display wherein the light transmission areas are provided in the parts of the light guiding plate opposed to the reels, the light guiding plate being formed on the back with light deflection patterns for guiding light from the light emission body into the liquid crystal panel, and one light deflection pattern formed in the surroundings of the light transmission areas is made denser than another light deflection pattern. Thus, if the player visually observes the light deflection pattern through the light transmission areas, it becomes hard for the player to visually recognize the light deflection pattern, and the gaming machine whose appearance is not impaired can be provided.

To produce the light guiding plate by molding, the reel window end faces and the light deflection patterns different in density in the surroundings can be formed at a time, leading to a reduction in the number of steps, and the light application amount from the reel window end face to the reel portion can also be increased.

Further, the gaming machine of the embodiment includes the liquid crystal display wherein the parts of the light guiding plate opposed to the reels are cut out or formed as recesses to provide the light transmission areas, the light guiding plate to which light deflection patterns for guiding light from the light emission body into the liquid crystal panel are transferred, and one light deflection pattern transferred to the surroundings of the light transmission areas is transferred as a denser pattern than another light deflection pattern. Thus, it becomes hard for the player to visually recognize the light deflection pattern, the appearance is not impaired, and the front space for bringing the reels close to the player can be formed for shortening the distance between the reels and the player, so that the powerful gaming machine can be provided.

As described above, according to the embodiment of the invention, even in a situation in which the player can visually observe the light deflection pattern formed on the back of the light guiding plate not via the diffusion sheet, it becomes hard for the player to visually recognize the rough light deflection pattern and the gaming machine whose appearance is not impaired can be provided.

As for the functions and the advantages described in the embodiment of the invention, the preferred functions and advantages produced from the invention are only enumerated and the functions and the advantages of the invention are not limited to those described in the embodiment of the invention.

As described above, in the invention, if the player sees the reel from the slanting direction, the player first visually recognizes in the surroundings of the reel, the first light deflection pattern denser than the second light deflection pattern, so that it is made possible to provide the gaming machine whose appearance is not impaired.

Although only some exemplary embodiments of the invention have been described in detail above, those skilled in the art will readily appreciate that many modifications are possible in the exemplary embodiments without materially departing from the novel teachings and advantages of the invention. Accordingly, all such modifications are intended to be included within the scope of the invention.

What is claimed is:

1. A gaming machine comprising:
   a liquid crystal display device including a liquid crystal panel, and a light guiding plate disposed at a rear of the liquid crystal panel and formed with a light deflection pattern configured to guide light emitted from illumination means for the liquid crystal panel to the liquid crystal panel; and
   a variable display device disposed at a rear of the liquid crystal display device and including a plurality of reels provided in a row each on which a plurality of symbols are arranged,
   wherein a part of the light guiding plate to which each of the reels is opposed is configured as a light transmission area for transmitting light from the reel,
   wherein the light guiding plate is formed with a first light deflection pattern on a periphery of the light transmission area and is formed with a second light deflection pattern in a portion more distant from the light transmission area than the first light deflection pattern, and
   wherein the first light deflection pattern is formed with a pattern denser than a pattern of the second light deflection pattern.

2. The gaming machine as claimed in claim 1, wherein the liquid crystal display device comprises light diffusion means disposed between the liquid crystal panel and the light guiding plate and having a light transmission area to which each of the reels is opposed, and wherein the first deflection pattern is formed in a portion of the light guiding plate where the first deflection pattern is visually recognized through the light transmission area of the light diffusion means.

3. The gaming machine as claimed in claim 1, wherein the illumination means comprises a plurality of cold-cathode tubes arranged in a depth direction in a proximity of an outer end face of the light guiding plate.

4. A gaming machine comprising:
   a liquid crystal display device including a liquid crystal panel, and a light guiding plate disposed at a rear of the liquid crystal panel and formed with a light deflection pattern configured to guide light emitted from a light source to the liquid crystal panel; and
   a variable display device disposed at a rear of the liquid crystal display device and including a plurality of reels provided in a row each on which a plurality of symbols are arranged,
   wherein a part of the light guiding plate to which each of the reels is opposed is configured as a light transmission area for transmitting light from the reel,
   wherein the light guiding plate is formed with a first light deflection pattern on a periphery of the light transmission area and is formed with a second light deflection pattern in a portion more distant from the light transmission area than the first light deflection pattern, and
   wherein the first light deflection pattern is formed with a pattern denser than a pattern of the second light deflection pattern.

5. The gaming machine as claimed in claim 1, wherein the liquid crystal display device comprises a light diffusion plate disposed between the liquid crystal panel and the light guiding plate and having a light transmission area to which each of the reels is opposed, and wherein the first deflection pattern is formed in a portion of the light guiding plate where the first deflection pattern is visually recognized through the light transmission area of the light diffusion means.

6. The gaming machine as claimed in claim 1, wherein the light source includes a plurality of cold-cathode tubes arranged in a depth direction in a proximity of an outer end face of the light guiding plate.

* * * * *